US010569344B2

(12) United States Patent
Ghadialy et al.

(10) Patent No.: US 10,569,344 B2
(45) Date of Patent: *Feb. 25, 2020

(54) METHOD AND SYSTEM FOR DEFINING THE POSITION OF A FASTENER WITH A PEEN MARK

(71) Applicant: The Boeing Company, Chicago, IL (US)

(72) Inventors: Hasan A. Ghadialy, Los Angeles, CA (US); Robert William Grube, Edmonds, WA (US); Ty Aaby Larsen, Everett, WA (US)

(73) Assignee: The Boeing Company, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/887,268

(22) Filed: Feb. 2, 2018

(65) Prior Publication Data
US 2018/0154457 A1 Jun. 7, 2018

Related U.S. Application Data

(63) Continuation of application No. 14/703,277, filed on May 4, 2015, now Pat. No. 9,884,372.

(51) Int. Cl.
B23B 35/00 (2006.01)
B23B 49/02 (2006.01)
(Continued)

(52) U.S. Cl.
CPC ............. B23B 49/02 (2013.01); B21J 15/142 (2013.01); B21J 15/28 (2013.01); B21J 15/44 (2013.01);
(Continued)

(58) Field of Classification Search
CPC . Y10T 408/21; Y10T 408/553; Y10T 408/34; Y10T 408/344; Y10T 408/348;
(Continued)

(56) References Cited

U.S. PATENT DOCUMENTS 2,029,650 A  2/1936 Betz
4,523,100 A  6/1985 Payne
(Continued)

FOREIGN PATENT DOCUMENTS

CA  1234002 A  3/1988
EP  0377755 A1  7/1990
(Continued)

OTHER PUBLICATIONS

Extended European Search Report for European Patent Application No. 16167756.2 dated Sep. 26, 2016, 8 pages.
(Continued)

Primary Examiner — Erica E Cadugan
Assistant Examiner — Yasir A Diab
(74) Attorney, Agent, or Firm — Alston & Bird LLP

(57) ABSTRACT

A method and system are provided to position and drill an opening for a fastener through one or more workpieces. In the context of a method, a peen mark is formed on a workpiece at a location at which the opening is to be drilled. The method also includes utilizing a robotic vision system to identify the peen mark on the workpiece and thereafter drilling the opening configured to receive the fastener at the location designated by the peen mark. In the context of a system, the system includes a dot peen marking system configured to form a peen mark on a workpiece at a location at which the opening is to be drilled. The system also includes a robot comprising a vision system configured to identify the peen mark on the workpiece and a drilling
(Continued)

machine configured to drill the opening at the location designated by the peen mark.

22 Claims, 3 Drawing Sheets

(51) Int. Cl.
| | |
|---|---|
| *B23B 49/00* | (2006.01) |
| *B21J 15/44* | (2006.01) |
| *B25H 7/04* | (2006.01) |
| *B25J 11/00* | (2006.01) |
| *B25J 19/02* | (2006.01) |
| *B21J 15/14* | (2006.01) |
| *B21J 15/28* | (2006.01) |
| *B23Q 17/24* | (2006.01) |
| *B23B 51/00* | (2006.01) |
| *B23Q 17/22* | (2006.01) |
| *B23Q 16/12* | (2006.01) |

(52) U.S. Cl.
CPC .............. *B23B 35/00* (2013.01); *B23B 49/00* (2013.01); *B23Q 17/24* (2013.01); *B25H 7/04* (2013.01); *B25J 11/005* (2013.01); *B25J 19/021* (2013.01); *B23B 51/0063* (2013.01); *B23B 2215/04* (2013.01); *B23Q 16/12* (2013.01); *B23Q 17/2233* (2013.01); *Y10T 29/49947* (2015.01); *Y10T 29/5118* (2015.01); *Y10T 408/21* (2015.01)

(58) Field of Classification Search
CPC ... Y10T 408/35; B23B 2215/04; B23B 51/08; B23B 51/0063; B23B 49/00; B23B 49/04; B23Q 16/003; B23Q 16/12; B23Q 17/22; B23Q 17/24; B23Q 17/2233; B23Q 17/225; B23Q 15/22
USPC .................................................. 29/90.7; 72/53
See application file for complete search history.

(56) References Cited

U.S. PATENT DOCUMENTS

| | | | |
|---|---|---|---|
| 9,162,332 | B2 | 10/2015 | Wright et al. |
| 2006/0104734 | A1 | 5/2006 | Mathis et al. |
| 2009/0162156 | A1 | 6/2009 | Collins |
| 2010/0185315 | A1 | 7/2010 | Schmidt et al. |
| 2013/0152397 | A1 | 6/2013 | Oberoi et al. |
| 2013/0185925 | A1 | 7/2013 | Sarh et al. |
| 2014/0375794 | A1 | 12/2014 | Singh |
| 2015/0041056 | A1 | 2/2015 | Hayton |
| 2015/0078845 | A1 | 3/2015 | Castle et al. |
| 2016/0082598 | A1 | 3/2016 | Anducas Aregall et al. |

FOREIGN PATENT DOCUMENTS

| | | |
|---|---|---|
| EP | 2522469 A1 | 11/2012 |
| GB | 1364740 A | 8/1974 |
| JP | 2003260611 A | 9/2003 |
| WO | WO 2014/184414 A1 | 11/2014 |

OTHER PUBLICATIONS

Office Action for European Application No. 16167756.2 dated Nov. 8, 2018.
Office Action for European Application No. 16167756.2 dated Jul. 16, 2019.

METHOD AND SYSTEM FOR DEFINING THE POSITION OF A FASTENER WITH A PEEN MARK

CROSS-REFERENCE TO RELATED APPLICATIONS

This application is a continuation of U.S. application Ser. No. 14/703,277, filed May 4, 2015, the entire contents of which are incorporated herein by reference.

TECHNOLOGICAL FIELD

An example embodiment of the present disclosure relates generally to the positioning and drilling of an opening for a fastener and, more particularly, to using a peen mark in order to position an opening for a fastener that is subsequently drilled in a workpiece.

BACKGROUND

Structures are oftentimes formed of a plurality of parts that are assembled and then secured with a plurality of fasteners, such as rivets or bolts. One example of such a structure is an aircraft that includes hundreds or thousands of parts that are assembled and then secured with even more fasteners. In order to install the fasteners, openings must be defined in the assembled parts, such as by drilling openings through the assembled parts with the size, e.g., diameter, of the openings approximating, such as by being slightly larger than, the size of the fasteners. The fasteners may then be inserted through the respective openings in order to secure the assembled parts.

In order to appropriately secure the parts, the fasteners must generally be placed in predefined positions relative to the assembled parts. Consequently, the openings through which the fasteners are to be subsequently inserted must also generally be located at the same predefined positions. In order to mark the predefined positions, pilot holes may be drilled at the predefined positions of the parts prior to their assembly. Pilot holes are typically significantly smaller in diameter than the openings that will be subsequently formed to receive the fasteners. The parts may then be assembled and the openings that will subsequently receive the fasteners may be formed, such as by drilling larger holes, such as holes having larger diameters, at the predefined positions marked by the pilot holes. Since the pilot holes are smaller than the openings that will subsequently receive the fasteners, the drilling of the openings to subsequently receive the fasteners will eliminate the pilot holes, even in instances in which the pilot holes drilled in the assembled parts are slightly mismatched or offset from one another.

While pilot holes serve to effectively locate the predefined positions of the fasteners, the formation of the pilot holes may be a time-consuming process. In this regard, each pilot hole must generally be individually drilled. While the time required to drill a pilot hole may vary based upon the type of material from which the parts are formed, the size of the pilot hole, the accessibility of the pilot hole and other factors, it may take approximately 3 minutes to drill a single pilot hole in a part that will be subsequently assembled to form an aircraft. Since at least some parts include numerous fasteners, such as hundreds or thousands of fasteners, and, as such, require numerous pilot holes, the drilling of the pilot holes may require a substantial amount of time, thereby increasing the time required to assemble the structure and the costs associated with assembling the structure.

BRIEF SUMMARY

A method and system are provided in order to position and drill an opening for a fastener through one or more workpieces. The method and system of an example embodiment utilize a peen mark to identify the location of the opening for the fastener. As such, the location of a fastener may be marked in an efficient manner such that the overall process for drilling an opening for and then installing a fastener is facilitated.

In an example embodiment, a method is provided for positioning and drilling an opening configured to receive a fastener. The method includes forming a peen mark on a workpiece at a location at which the opening is to be drilled. The method also includes utilizing a robotic vision system to identify the peen mark on the workpiece. The method further includes drilling the opening configured to receive the fastener at the location designated by the peen mark.

The method of an example embodiment forms the peen mark at a predefined orientation. In this embodiment, the method identifies the predefined orientation of the peen mark and drills the opening at the predefined orientation. The peen mark may be smaller than the opening drilled at the location. In an example embodiment, the method forms the peen mark by forming a plurality of peen marks in a predetermined pattern on the workpiece at the location. The plurality of peen marks of this example embodiment are collectively smaller than the opening drilled at the location.

The method of an example embodiment also includes carrying the robotic vision system with an end effector during identification of the peen mark. Following identification of the peen mark, the method of this example embodiment replaces the robotic vision system with a drilling machine carried by the end effector such that the opening is thereafter drilled with the drilling machine carried by the end effector. The method of an example embodiment also includes assembling the workpiece with another workpiece prior to identifying the peen mark and drilling the opening.

In another embodiment, a method is provided for positioning and drilling an opening configured to receive a fastener. The method includes forming a peen mark on a workpiece at a predefined orientation and at a location at which the opening is to be drilled. The method also includes identifying the peen mark on the workpiece and the predefined orientation of the peen mark. The method further includes drilling the opening configured to receive the fastener at the predefined orientation and at the location designated by the peen mark.

The peen mark of an example embodiment is smaller than the opening drilled at the location. In regards to forming the peen mark, the method of an example embodiment forms a plurality of peen marks in a predetermined pattern on the workpiece at the location. The plurality of peen marks of this example embodiment are collectively smaller than the opening drilled at the location.

The method of an example embodiment identifies the peen mark with a robotic vision system carried by an end effector. Following identification of the peen mark, the method of this example embodiment also includes replacing the robotic vision system with a drilling machine carried by the end effector such that the opening is thereafter drilled with the drilling machine carried by the end effector. The method of an example embodiment also includes assembling the workpiece with another workpiece prior to identifying the peen mark and drilling the opening.

In a further example embodiment, a system is provided for positioning and drilling an opening configured to receive a fastener. The system includes a dot peen marking system configured to form a peen mark on a workpiece at a location at which the opening is to be drilled. The system also includes a robot comprising a vision system configured to identify the peen mark on the workpiece and a drilling machine configured to drill the opening configured to receive the fastener at the location designated by the peen mark.

The dot peen marking system of an example embodiment is further configured to form the peen mark at a predefined orientation. The vision system of this example embodiment is further configured to identify the predefined orientation of the peen mark, and the drilling machine is further configured to drill the opening at the predefined orientation. The robot of an example embodiment further includes an end effector that alternately carries the robotic vision system and the drilling machine.

The peen mark of an example embodiment is smaller than the opening drilled at the location. The dot peen marking system of an example embodiment is further configured to form a plurality of peen marks in a predetermined pattern on the workpiece at the location. The plurality of peen marks may be collectively smaller than the opening drilled at the location. In an example embodiment, the workpiece is assembled with another workpiece prior to utilizing the robot to identify the peen mark and drill the opening.

BRIEF DESCRIPTION OF THE DRAWINGS

Figure 1:
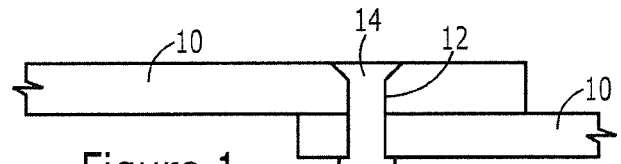
Figure 2:
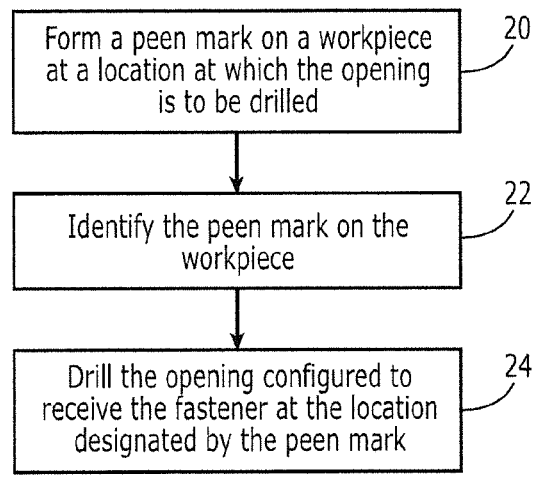
Figure 3:
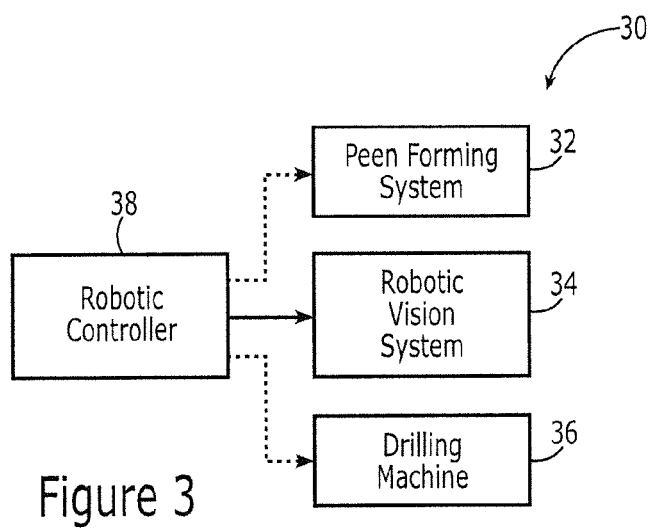
Figure 4A:
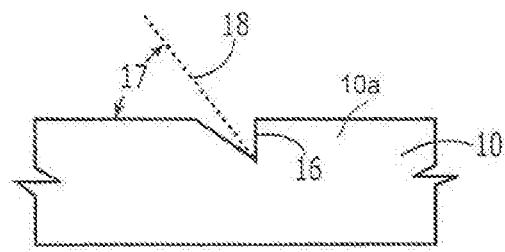
Figure 4B:
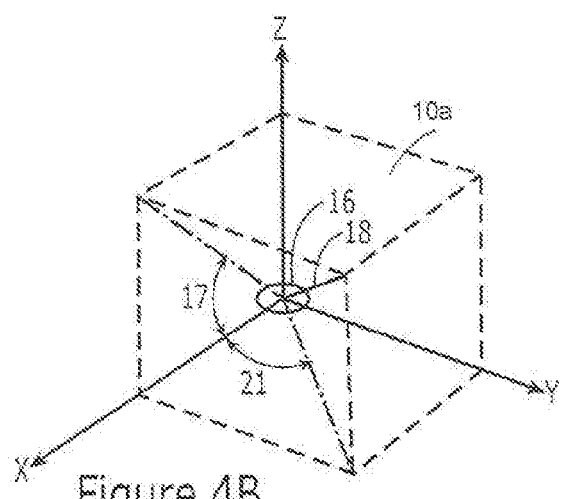
Figure 5:
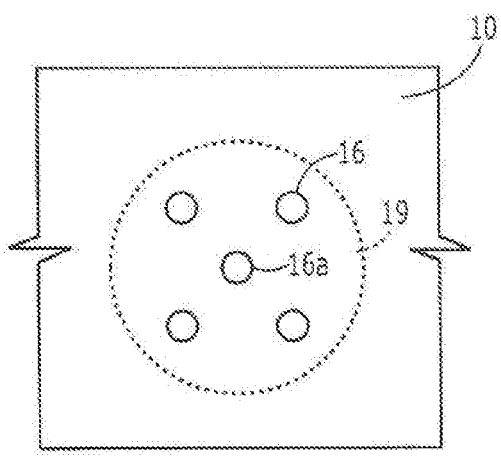
Figure 6:
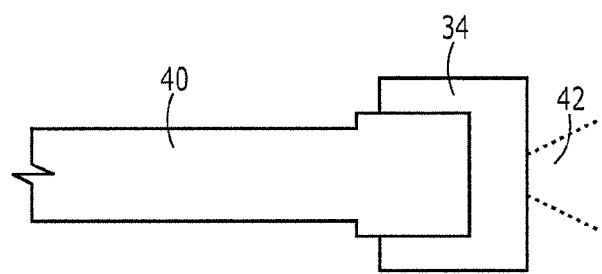
Figure 7:
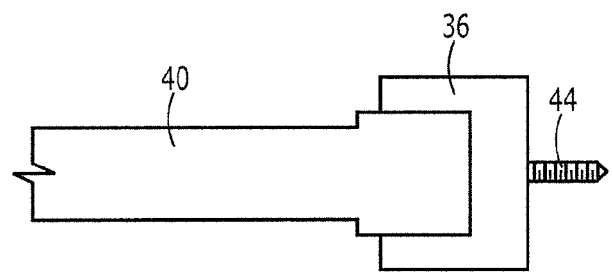

Having thus described embodiments of the present disclosure in general terms, reference will now be made to the accompanying drawings, which are not necessarily drawn to scale, and wherein:

FIG. 1 is a cross-sectional view of a pair of workpieces secured with a fastener extending through aligned openings defined by the workpieces;

FIG. 2 is a flowchart of the operations performed in accordance with an example embodiment of the present disclosure;

FIG. 3 illustrates a system for positioning and drilling an opening configured to receive a fastener in accordance with an example embodiment of the present disclosure;

FIG. 4A illustrates a peen mark having a predefined orientation that identifies the location and orientation of an opening to be formed within the workpiece in accordance with an example embodiment of the present disclosure;

FIG. 4B illustrates a plurality of angles defined by the predefined orientation of a peen mark in accordance with an example embodiment of the present disclosure;

FIG. 5 illustrates a plurality of peen marks in a predetermined pattern that identify the location of an opening to be formed within the workpiece in accordance with an example embodiment of the present disclosure;

FIG. 6 illustrates an end effector of the system of FIG. 3 carrying a robotic vision system during identification of the peen mark in accordance with an example embodiment of the present disclosure; and FIG. 7 illustrates an end effector of the system of FIG. 3 carrying a drilling machine during drilling of the opening in the workpiece in accordance with an example embodiment of the present disclosure.

DETAILED DESCRIPTION

Embodiments of the present disclosure now will be described more fully hereinafter with reference to the accompanying drawings, in which some, but not all embodiments are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout.

A method and system are provided in accordance with an example embodiment in order to precisely position and then drill one or more openings in a part such that respective fasteners may then be inserted through the openings in order to secure the part to another part. In this regard, structures frequently include a plurality of parts that are assembled and then secured to one another with a plurality of fasteners, such as rivets, bolts or the like. Although any of a wide variety of structures may be assembled in this manner, an aircraft, for example, is a structure that is formed of a plurality of parts, such as hundreds of parts that are assembled and then secured to one another with a plurality of fasteners, such as hundreds or thousands of fasteners. Prior to installing the fasteners, openings are formed, such as by drilling, through the respective parts, termed workpieces, at the precise locations at which the fasteners are to be installed. The openings have a size, such as a diameter, that matches or is slightly larger than the fastener such that the fasteners may thereafter be inserted through the aligned openings of two or more workpieces in order to secure the workpieces together during the assembly of the structure.

By way of example, FIG. 1 is a cross-sectional view of a pair of workpieces 10. The workpieces 10 may be formed of various materials including metal materials, composite materials or the like. Openings 12 have been defined in each of the workpieces 10 and a fastener 14, such as a rivet, has been installed through the aligned openings defined by the pair of workpieces so as to secure the workpieces together, such as during the assembly of a larger structure.

In order to facilitate an opening 12 being formed, such as by being drilled at a desired location relative to the workpiece 10, a method and system are provided herein that form a peen mark 16 (shown in FIG. 4A, for example) to define the location of the opening to be defined in the workpiece and, in turn, the location of the fastener 14 to be inserted through the respective opening.

In this regard, FIG. 2 is a flowchart illustrating the operations performed in order to precisely position and then drill an opening 12 through a workpiece 10 utilizing a peen mark 16 to locate the opening. As shown in block 20 of FIG. 2, the peen mark 16 is initially be formed on the workpiece 10 at a location at which the opening 12 is to be drilled, that is, at the location at which a fastener 14 is to be installed. The location may be identified in various manners. For example, a technician may identify the location based upon their past experience with a workpiece 10 of the particular type, e.g., a wing panel, a spar, etc. Alternatively, the location may be defined by plans, drawings or other instructions relating to the assembly of the overall structure or a least a portion of the structure, e.g. a subassembly. Regardless of the manner in which the location is defined, a peen mark 16 is then formed on the workpiece 10 at the respective location.

A peen mark 16 is a depression created in the surface of the workpiece 10. The depression may have various shapes, such as a wedge-shape, a curved shape or a spherical shape, depending upon the corresponding shape of the tool, such as the hammer, e.g., a ball peen hammer, with which the peen mark 16 is formed. The peen mark 16 may be formed in various manners. In an example embodiment, however, a system 30 for positioning and drilling an opening 12 within a workpiece 10 includes a dot peen marking system 32, such as a dot peen marking machine. In this embodiment, the workpiece 10 is secured in a predetermined position by a gantry of the dot peen marking system 32 and the dot peen marking machine may then form a peen mark 16 on the workpiece at a respective location. The peen mark 16 may generally be formed more quickly and efficiently than a corresponding pilot hole.

The peen mark 16 is smaller than the opening 12 to be drilled at the location. In this regard, the peen mark 16 is smaller in diameter or other cross-sectional dimensions than the corresponding diameter or other cross-sectional dimensions of the opening 12 to be drilled through the workpiece 10 at the location identified by the peen mark. The peen mark 16 may be formed so as to have a predefined orientation, such as defined by the central axis 18 or axis of symmetry of the peen mark as shown in FIG. 4A, as defined by the direction in which the force to form the peen mark is provided. The predefined orientation of the peen mark 16 may be a predefined angle 17 relative to the surface 10a of the workpiece 10 proximate the peen mark. For example, the peen mark 16 may be formed to have a predefined orientation of 90° relative to the surface of the workpiece 10 proximate the peen mark 16, that is, to be perpendicular to the workpiece. Alternatively, as shown by angle 17 in FIG. 4A, the peen mark 16 may be formed to have a predefined orientation of 45° relative to the surface 10a of the workpiece 10 proximate the peen mark 16. Or, the peen mark 16 may be formed to be at some other angle 17 relative to the surface 10a of the workpiece 10 proximate the peen mark 16. As shown in FIG. 4B, the predefined orientation of the peen mark 16 may be defined by a plurality of angles including the angle of inclination 17 from the surface 10a of the workpiece 10 (as represented by the xy plane in FIG. 4B) and the angle of rotation 21 from the xz plane. In this regard, the projection of the central axis 18 or axis of symmetry of the peen mark 16 is projected onto the xz and xy planes as represented by the respective dotted and dashed lines.

As described below, the predefined orientation of the peen mark 16 correspondingly defines the angle at which the opening 12 will be drilled through the workpiece 10 at the location identified by the peen mark. In this regard, the opening 12 to be drilled through the workpiece 10 at the location identified by the peen mark 16 generally has the same orientation as the predefined orientation of the peen mark.

Although the location on the workpiece 10 may be identified by a single peen mark 16, the method and system of an example embodiment may form a plurality of peen marks in a predetermined pattern on the workpiece at the respective location, as shown in FIG. 5. In this embodiment, the plurality of peen marks 16 are smaller than the opening 12 to be drilled at the location when the plurality of peen marks are considered collectively or in their entirety. For example, FIG. 5 depicts the diameter of the opening 12 to be subsequently drilled at the location identified by the plurality of peen marks 16 with a dashed line 19. The dashed line 19 representative of the size of the opening 12 to be subsequently drilled in the workpiece 10 is larger than the entire pattern of peen marks 16. Thus, the subsequent drilling of the opening 12 will consume the plurality of peen marks 16 arranged in a predetermined pattern in accordance with this example embodiment.

Various predefined patterns of peen marks 16 may be defined including, for example, the predetermined pattern depicted in FIG. 5 having five peen marks arranged in the shape of an X. The opening 12 to thereafter be drilled at the location identified by the plurality of peen marks 16 arranged in the predetermined pattern may be centered about a specific portion of the predetermined pattern, such as the centermost peen mark 16a of the predetermined pattern of FIG. 5. In the embodiment of FIG. 5 which includes a plurality of peen marks 16 arranged in a predetermined pattern, the plurality of peen marks may also define the orientation of the opening 16 to be drilled through the workpiece 10. In this regard, each of the plurality of peen marks 16 may be formed to have the predefined orientation at which the opening 12 is to be drilled. Alternatively, only some, such as one, of the plurality of peen marks 16 may be formed to have the predefined orientation at which the opening 12 is to be drilled with the remainder of the peen marks being formed at any desired orientation, such as in an orientation that extends at 90° to the surface of the workpiece 10 proximate the peen marks. For example, a single predefined one of the plurality of peen marks 16, such as the centermost peen mark 16a, may be formed to have the predefined orientation of 45° with the remainder of the peen marks being formed to have an orientation that extends 90° to the surface of the workpiece 10.

As shown in block 22 of FIG. 2, the peen mark 16 on the workpiece 10 is then identified. In those embodiments that rely upon the predefined orientation of the peen mark 16 to, in turn, define the orientation of the opening 12 to be drilled at the respective location, the predefined orientation of the peen mark is also identified. The peen mark 16 may be identified in various manners. For example, a technician may visually identify the peen mark 16.

Alternatively, the system 30 may include a robotic vision system 34 that is configured to identify the peen mark, as shown in FIG. 3. The robotic vision system 34 may be configured and/or trained in order to identify peen marks and, in some embodiments, the predefined orientation at which the peen marks have been formed in the workpiece 10. A robotic vision system 34 may identify a peen mark 16 in various manners. In an example embodiment, however, a robotic vision system 34 is configured to scan the surface of the workpiece 10 to identify each of the peen marks 16. In this regard the robotic vision system 34 of an example embodiment may be configured to scan an initial search area that encompasses a portion of the workpiece 10 to locate a peen mark 16. The initial search area may be defined in various manners, but, in one embodiment, is defined to be a square area, such as 5 inch by 5 inch square area. After scanning the initial search area to locate the peen mark(s) 16 therein, the robotic vision system 34 may be configured to repeatedly scan other search areas until the entire workpiece 10 has been inspected.

In order to facilitate the identification of the peen mark(s) 16 by the robotic vision system 34, the system 30 and/or the robotic vision system may be provided with information regarding the number of openings 12 and the general location of the openings to be drilled in the workpiece 10. As such, the robotic vision system 34 may identify the search area so as to include the location(s) at which one or more openings 16 will be drilled, as the likelihood of identifying one or more peen mark(s) 16 is substantially increased and the efficiency of the search process is correspondingly enhanced.

After identifying a potential peen mark within a search area, the robotic vision system 34 may reduce the size of the search area in order to more closely assess whether the potential mark is an actual peen mark 16, such as by capturing a more detailed image of the potential peen mark and comparing the image with predefined images of peen marks, such as peen marks of various predefined orientations. In an instance in which the mark is not identified as a peen mark or in which a peen mark is not located within the search area, the robotic vision system 34 may proceed to inspect another search area in an effort to identify a peen mark 16 until the entire workpiece 10 has been inspected. However, in an instance in which the potential peen mark is confirmed to be an actual peen mark 16, the location of the peen mark is recorded, such as in a memory device, and, in some embodiments, the predefined orientation of the peen mark is also identified and recorded.

As shown in block 24 of FIG. 2, the opening 12 is then drilled through the workpiece 10 at the location designated by the peen mark 16. In an embodiment that relies upon the predefined orientation of the peen mark 16 to, in turn, define the orientation of the opening 12, the opening is also drilled at the same predefined orientation as the peen mark. The opening 12 may be drilled in various manners, but, in one embodiment depicted in FIG. 3, is drilled by a drilling machine 36. As described above, the opening 12 may be drilled at the location identified by the peen mark 16 and, in some embodiments, at the orientation defined by the predefined orientation of the peen mark. The size, e.g., the diameter, of the opening 12 that is drilled approximates the size of the fastener 14 that is to be installed through the opening, such as by equaling or being slightly larger than the size of the fastener, e.g., the diameter of the fastener.

After forming the openings 12 in the workpiece 10, two or more workpieces may be assembled such that respective openings 16 defined by the workpieces are aligned. Alternatively, the workpieces 10 may have been pre-assembled prior to the inspection of the workpiece by the robotic vision system 34 and the drilling of the openings 12. In either instance, a fastener 14, such as a bolt, rivet or the like, may then be inserted through the aligned openings 12 in order to secure the workpieces 10 together, such as shown in FIG. 1, in order to at least partially assemble the resulting structure.

Although a variety of drilling machines 36 may be utilized to form the opening 12 including, for example, manually operated drilling machines, the system 30 of an example embodiment includes a robot that includes both the vision system 34 described above in order to identify the peen mark 16 and the drilling machine 36 that is configured to drill the opening at the location designated by the peen mark. The robot of this example embodiment may also include a robot controller 38, such as a computer or other computerized controller, in order to control operations of the vision system 34 and the drilling machine 36. The robot of an example embodiment may include an end effector 40 that is configured to alternately engage and carry the robotic vision system 34 and the drilling machine 36. In this regard, the robot is configured to position the end effector 40 such that the robotic vision system 34 or the drilling machine 36 carried thereby is located in a desired manner relative to the workpiece 10. In this example embodiment and as shown in FIG. 6, the robot may be configured to initially carry the robotic vision system 34 with the end effector 40 to permit the workpiece 10 to be inspected, such as within field of view 42, and one or more peen marks 16 to be identified. The robot of this example embodiment is then configured to release or disengage the robotic vision system 34 and to engage the drilling machine 36 as shown in FIG. 7 such that the drilling machine is then positioned by the end effector 40 at the location of the peen mark 16 identified by the vision system 34 such that the drilling system, such as a drill bit 44 depicted by way of example in FIG. 7, then drills an opening 12 at the location (and, in some embodiments, at the predefined orientation) identified by the peen mark.

Although the peen marking system 32 may be operated independently of the robot and its robotic vision system 34 and the drilling machine 36, the robot, such as the robot controller 38, of an example embodiment may also interoperate with the peen marking system. In this embodiment, the end effector 40 of the robot may initially engage the peen marking system 32 so as to position the peen marking system relative to the workpiece 10 so as to form the peen marks 16 at the desired locations and, in some embodiments, at the desired orientations. The end effector 40 may then release the peen marking system 32 and subsequently alternatively engage the robotic vision system 34 and the drilling machine 36 to identify the peen marks 16 and then drill the openings 12 at the desired locations of the workpiece 10.

A method and system 30 are therefore provided in order to position and drill an opening 12 for a fastener 14 through one or more workpieces 10. The method and system 30 of an example embodiment utilize a peen mark 16 to identify the location and, in some embodiments, the orientation of the opening 12 for the fastener 14. As such, the location of a fastener 14 may be marked in an efficient manner such that the overall process for drilling an opening 12 for and then installing a fastener is performed in an efficient manner.

Many modifications and other embodiments set forth herein will come to mind to one skilled in the art to which these embodiments pertain having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

That which is claimed:

1. A method of positioning and drilling an opening configured to receive a fastener, the method comprising:
   forming a peen mark on a workpiece at a location at which the opening is to be drilled, wherein the peen mark is formed at an orientation as defined by a predefined angle of inclination between a central axis of the peen mark and a surface in which the opening is to be drilled and an angle of rotation between the central axis of the peen mark and a reference plane extending outwardly from the surface, wherein the predefined angle of inclination of the peen mark is other than 90° such that the orientation of the peen mark is non-orthogonal relative to the surface;
   identifying, with a robotic vision system, the peen mark on the workpiece including identification of the orientation of the peen mark relative to the surface as defined by the angle of inclination and the angle of rotation of the central axis of the peen mark; and
   after the identification of the orientation of the peen mark, drilling the opening configured to receive the fastener at the location designated by the peen mark, wherein drilling the opening comprises drilling the opening to have an orientation that is the same as the orientation of the peen mark that has been identified.

2. A method according to claim 1 wherein the peen mark is smaller than the opening drilled at the location.

3. A method according to claim 1 wherein forming the peen mark comprises forming a plurality of peen marks in a predetermined pattern on the workpiece at the location.

4. A method according to claim 3 wherein the plurality of peen marks are collectively smaller than the opening drilled at the location.

5. A method according to claim 1 further comprising:
carrying the robotic vision system with an end effector during identification of the peen mark; and
following identification of the peen mark, replacing the robotic vision system with a drilling machine carried by the end effector,
wherein drilling the opening comprises drilling the opening with the drilling machine carried by the end effector.

6. A method according to claim 1 further comprising assembling the workpiece with another workpiece prior to identifying the peen mark and drilling the opening.

7. A method according to claim 1 wherein identifying the peen mark on the workpiece including identification of the orientation of the peen mark relative to the surface comprises capturing an image of the peen mark and comparing the image of the peen mark with a plurality of images of peen marks of various predefined orientations.

8. A method of positioning and drilling an opening configured to receive a fastener, the method comprising:
forming a peen mark on a workpiece at an orientation and at a location at which the opening is to be drilled, wherein the orientation of the peen mark is defined by a predefined angle of inclination between a central axis of the peen mark and a surface in which the opening is to be drilled and an angle of rotation between the central axis of the peen mark and a reference plane extending outwardly from the surface;
identifying the peen mark on the workpiece including identification of the orientation of the peen mark relative to the surface as defined by the angle of inclination and the angle of rotation of the central axis of the peen mark; and
after the identification of the orientation of the peen mark, drilling the opening configured to receive the fastener at the location designated by the peen mark, wherein drilling the opening comprises drilling the opening to have an orientation that is the same as the orientation of the peen mark that has been identified.

9. A method according to claim 8 wherein forming the peen mark comprises forming a plurality of peen marks in a predetermined pattern on the workpiece at the location.

10. A method according to claim 9 wherein the plurality peen marks are collectively smaller than the opening drilled at the location.

11. A method according to claim 8 wherein identifying the peen mark comprises identifying the peen mark with a robotic vision system carried by an end effector, wherein the method further comprises, following identification of the peen mark, replacing the robotic vision system with a drilling machine carried by the end effector, and wherein drilling the opening comprises drilling the opening with the drilling machine carried by the end effector.

12. A method according to claim 8 further comprising assembling the workpiece with another workpiece prior to identifying the peen mark and drilling the opening.

13. A method according to claim 8 wherein the peen mark is smaller than the opening drilled at the location, and wherein the predefined angle of the peen mark is other than 90° such that the orientation of the peen mark is non-orthogonal relative to the surface.

14. A method according to claim 8 wherein identifying the peen mark on the workpiece including identification of the orientation of the peen mark relative to the surface comprises capturing an image of the peen mark and comparing the image of the peen mark with a plurality of images of peen marks of various predefined orientations.

15. A system for positioning and drilling an opening configured to receive a fastener, the system comprising:
a dot peen marking system configured to form a peen mark on a workpiece at a location at which the opening is to be drilled, wherein the dot peen marking system is further configured to form the peen mark at an orientation as defined by a predefined angle of inclination between a central axis of the peen mark and a surface in which the opening is to be drilled and an angle of rotation between the central axis of the peen mark and a reference plane extending outwardly from the surface; and
a robot comprising a vision system configured to identify the peen mark on the workpiece and to identify the orientation of the peen mark relative to the surface as defined by the angle of inclination and the angle of rotation of the central axis of the peen mark and a drilling machine configured, after identification of the orientation of the peen mark, to drill the opening configured to receive the fastener at the location designated by the peen mark, wherein the drilling machine is also configured to drill the opening to have an orientation that is the same as the orientation of the peen mark that has been identified by the vision system.

16. A system according to claim 15 wherein the peen mark is smaller than the opening drilled at the location.

17. A system according to claim 15 wherein the dot peen marking system is further configured to form a plurality of peen marks in a predetermined pattern on the workpiece at the location.

18. A system according to claim 17 wherein the plurality peen marks are collectively smaller than the opening drilled at the location.

19. A system according to claim 15 wherein the robot further comprises an end effector that alternately carries the robotic vision system and the drilling machine.

20. A system according to claim 15 wherein the workpiece is assembled with another workpiece prior to utilizing the robot to identify the peen mark and drill the opening.

21. A system according to claim 15 wherein the predefined angle of the peen mark is other than 90° such that the orientation of the peen mark is non-orthogonal relative to the surface.

22. A system according to claim 15 wherein the vision system is configured to identify the orientation of the peen mark relative to the surface by capturing an image of the peen mark and comparing the image of the peen mark with a plurality of images of peen marks of various predefined orientations.

* * * * *